US012265926B1

(12) United States Patent
Smith et al.

(10) Patent No.: US 12,265,926 B1
(45) Date of Patent: Apr. 1, 2025

(54) APPARATUS AND METHOD FOR DETERMINING THE RESILIENCE OF AN ENTITY

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/398,466

(22) Filed: Dec. 28, 2023

(51) Int. Cl.
*G06Q 10/0637* (2023.01)
*G06F 9/451* (2018.01)
*G06N 7/01* (2023.01)
*G06Q 40/00* (2023.01)

(52) U.S. Cl.
CPC .............. *G06N 7/01* (2023.01); *G06F 9/451* (2018.02); *G06Q 10/06375* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 10,530,666 B2 * | 1/2020 | Venkitapathi | H04L 43/045 |
| 11,341,517 B2 * | 5/2022 | Selvadurai | G06N 20/00 |
| 11,580,330 B2 * | 2/2023 | Zeng | G06Q 10/063 |
| 2004/0133439 A1 * | 7/2004 | Noetzold | G06Q 40/00 |
| | | | 705/347 |
| 2006/0271472 A1 * | 11/2006 | Cagan | G06Q 40/02 |
| | | | 705/38 |
| 2008/0133300 A1 * | 6/2008 | Jalinous | G06Q 10/0637 |
| | | | 705/7.29 |
| 2014/0156323 A1 * | 6/2014 | Prieto | G06Q 10/0631 |
| | | | 705/7.12 |
| 2014/0330600 A1 * | 11/2014 | Candas | G06Q 10/06313 |
| | | | 705/7.12 |
| 2016/0034838 A1 * | 2/2016 | Gembicki | G06Q 10/0639 |
| | | | 705/7.39 |
| 2016/0350781 A1 * | 12/2016 | Feduk, Jr. | G06Q 30/0214 |
| 2019/0265684 A1 * | 8/2019 | Torkoly | G06Q 10/0637 |
| 2019/0347668 A1 * | 11/2019 | Williams | G06F 18/23 |
| 2021/0201412 A1 * | 7/2021 | Goh | G06Q 40/02 |
| 2021/0350304 A1 * | 11/2021 | Bhowmik | G06Q 10/06393 |
| 2022/0129734 A1 * | 4/2022 | Kurasawa | G06Q 10/04 |
| 2022/0293107 A1 * | 9/2022 | Leaman | G06F 16/951 |
| 2022/0391815 A1 * | 12/2022 | Hampapur | G06Q 10/067 |

* cited by examiner

Primary Examiner — Jamie H Austin
(74) Attorney, Agent, or Firm — Caldwell Intellectual Property Law

(57) ABSTRACT

An apparatus for determining the resilience of an entity, the apparatus including at least a processor and a memory communicatively connected to the at least a processor, the memory containing instructions configuring the at least a processor to receive entity data from a user, select at least one probability indicator as a function of the entity data, determine a life probability of the entity as a function of the at least one probability indicator comprising, receiving life training data comprising a plurality of the least one probability indicators correlated to a plurality of life probabilities, training a life machine learning model as a function of the life training data, and determining the life probability as a function of the life machine learning model, and generate a growth approach as a function of the life probability.

20 Claims, 8 Drawing Sheets

US 12,265,926 B1

APPARATUS AND METHOD FOR DETERMINING THE RESILIENCE OF AN ENTITY

FIELD OF THE INVENTION

The present invention generally relates to the field of artificial intelligence. In particular, the present invention is directed to determining the resilience of an entity.

BACKGROUND

Current systems used to determine the resilience of an entity are lacking and do not rely on historical data to properly assess the health of an entity. In addition, current systems do not provide adequate feedback to solve any deficiencies of the entity.

SUMMARY OF THE DISCLOSURE

In an aspect, an apparatus for determining the resilience of an entity is described. The apparatus includes at least a processor and a memory communicatively connected to the at least a processor. The memory contains instructions configuring the at least a processor to receive entity data from a user, select at least one probability indicator as a function of the entity data and determine a life probability of the entity as a function of the at least one probability indicator. Determining the life probability includes receiving life training data having a plurality of the least one probability indicators correlated to a plurality of life probabilities, training a life machine learning model as a function of the life training data, and determining the life probability as a function of the life machine learning model. The memory further contains instructions configuring the at least a processor to generate a growth approach as a function of the life probability.

In another aspect, a method for determining the resilience of an entity is described. The method includes receiving, by at least a processor, entity data from a user, selecting, by the at least a processor, at least one probability indicator as a function of the entity data, determining, by the at least a processor, a life probability of the entity as a function of the at least one probability indicator including, receiving life training data comprising a plurality of the least one probability indicators correlated to a plurality of life probabilities, training a life machine learning model as a function of the life training data, and determining the life probability as a function of the life machine learning model. The method further includes generating, by the at least a processor, a growth approach as a function of the life probability.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for determining the resilience of an entity. In an embodiment, apparatus includes a computing device configured to receive entity data. In some cases apparatus further includes a graphical user interface to display one or more data elements generated by computing device.

Aspects of the present disclosure can be used to determine the resilience of an entity. Aspects of the present disclosure can also be used to increase the resilience of an entity. Aspects of this disclosure can also be used to increase the resilience of an entity based on probability indicators that are associated with a lower probability deviation. Exemplary embodiments illustrating aspects of the present disclosure are described below in the context of several specific examples.

Figure 1:
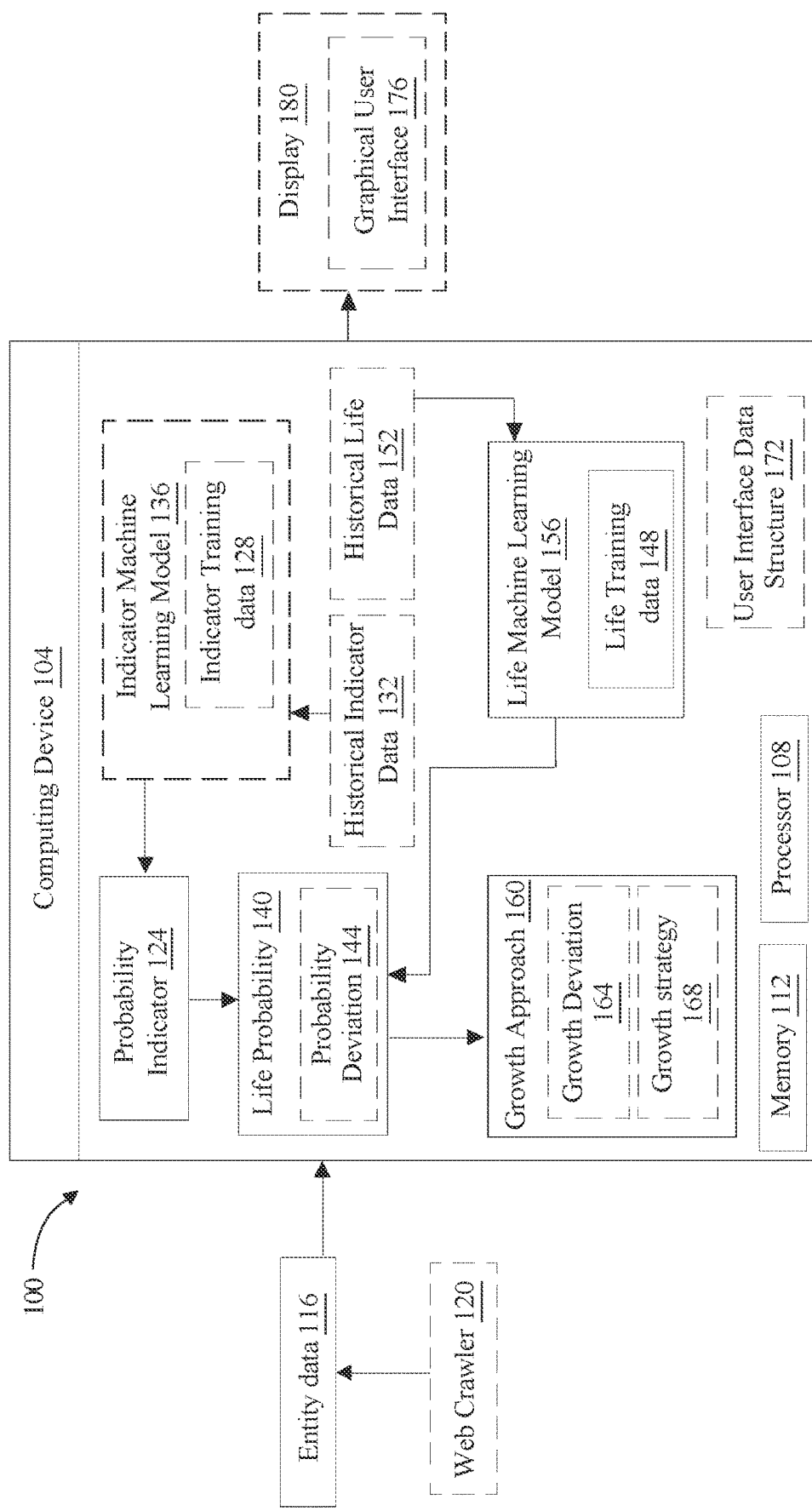
FIG. 1 is a block diagram of an exemplary embodiment of an apparatus for determining the resilience of an entity.

Referring now to FIG. 1, an exemplary embodiment of an apparatus 100 for determining the resilience of an entity is illustrated. "Resilience" for the purpose of this disclosure is the ability of an entity to continue operating over a given period of time. This may include but is not limited to, how long an entity may be in business, the entity's ability to grow, the entity's ability to overcome various economic downturns, and the like.

With continued reference to FIG. 1, apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor 108 module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, the at least a processor 108 is configured to receive entity data 116 from a user. As used in the current disclosure, "entity data" is information associated with an entity. As used in the current disclosure, an "entity" is an organization comprised of one or more persons with a specific purpose. An entity may include a corporation, organization, business, group, and the like. As used in the current disclosure, a "user" is a figure associated with the entity. The user may include a manager, owner, employee, potential manager, potential shareholder of the entity, or shareholder of the entity. Entity data 116 may include information regarding the entity's revenue, gross income, net income, business debts, a list of business expenses, current inventory, inventory history, sales information, human resource information, employee information, employee salaries, timecards, a list of company assets, a list of capital projects, accounting information, and the like. In some cases, an entity profile containing a plurality of entity data 116 may be created by processor 108. "Entity profile" for the purposes of this disclosure is a data structure representing an entity. Entity profile may be made of a plurality of entity data 116.

With continued reference to FIG. 1, entity data 116 may include information describing recent actions taken by an entity such as, a merger, bankruptcy proceedings, lawsuits, disclosures of financial statements, news articles about the entity, recent hires, recent layoffs, public and/or private disclosure of financial statements, employee retention, and the like. In some cases, entity data 116 may further include information such as diversification of technologies, diversification of customer bases, the infrastructure of the entity, number of customers, customer growth, rate of expansions, rate of increased costs, rate of increased revenue, projected growth, degree of debt (e.g. interest rate, variable interests, non-variable interest, loan period and the like), increased profits, and the like. In some cases, entity data 116 may include information indicating the entity's resilience to a recession. This may include data such as cash on hand, the company's expected financials' during a recession, and any other data that may indicate an entity's ability to overcome a recession.

With continued reference to FIG. 1, in some cases, entity data 116 may include function data. As used in the current disclosure, "function data" is data associated with the action performed by an employee for the furtherance of the purpose of the entity. As used in the current disclosure, a "function" is a task or action performed by an employee or user for the furtherance of the purpose of the entity. Function data may comprise employee function data, owner function data, manager function data, and the like. Function data may describe the responsibilities of an employee, manager, or owner. Function data may represent internal or external tasks as it relates to the entity. Examples of function data may include, but are not limited to, data describing managerial responsibilities, providing a service, making goods, maintaining a facility, interfacing with clients, accounting activities, product selection, ordering inventory, hiring/firing of employees, employee management, resource management, assigning tasks, and the like.

With continued reference to FIG. 1, in some cases, entity data 116 may further include financial data. "Financial data" for the purpose of this disclosure is any pecuniary information associated with an entity. Financial data may include data such as, income of the company, net losses, net gains, total revenue, total products and/or services sold, total money invested, total property owned, monthly mortgage amount, debt owed, interest on debt owed, money spent on research, amount paid for property rent, amount paid for salaries, amount of employees and their corresponding salaries, increase in growth over a specific period of time, decrease in growth over a specific period of time, and the like.

With continued reference to FIG. 1, entity data 116 may include entity records. As used in the current disclosure, an "entity record" is a document that contains information regarding the entity. Entity records may include employee credentials, reports, financial records, medical records, business records, Asset inventory, sales history, sales predictions, and government records (i.e. birth certificates, social security cards, and the like). An entity record may additionally include an employee record. An employee record may include things like employee evaluations, human resource records, client files, invoices, timecards, driver's license databases, news articles, social media profiles and/or posts, and the like. Entity records may be identified using a web crawler 120. Entity records may include a variety of types of "notes" entered over time by the user, employees of the user, support staff, advisors, and the like.

With continued reference to FIG. 1, entity data 116 may be received by the at least a processor 108 via user input. For example, and without limitation, the user or a third party may manually input entity data 116 using a user interface of a computing device 104 or a remote device, such as for example, a smartphone or laptop. Entity data 116 may additionally be generated via the answer to a series of questions. The series of questions may be implemented using a chatbot, as described herein below. A chatbot may be configured to generate questions regarding any element of entity data 116. In a non-limiting embodiment, a user may be prompted to input specific information or may fill out a questionnaire. In an embodiment, a graphical user interface may display a series of questions to prompt a user for information pertaining to entity data 116. Entity data 116 may be transmitted to processor 108, such as via wired or wireless communication, as previously discussed in this disclosure. Entity data 116 can be retrieved from multiple sources third-party sources including the user's inventory records, financial records, human resource records, past entity data 116, sales records, user notes and observations, job descriptions, and the like.

With continued reference to FIG. 1, entity data 116 may include files or documents that have been converted in machine-encoded test using an optical character reader (OCR). In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, entity data 116 may be generated using a web crawler 120. A "web crawler," as used herein, is a program that systematically browses the internet for the purpose of Web indexing. The web crawler 120 may be seeded with platform URLs, wherein the crawler may then visit the next related URL, retrieve the content, index the content, and/or measures the relevance of the content to the topic of interest. In some embodiments, computing device 104 may generate a web crawler 120 to compile entity data 116. The web crawler 120 may be seeded and/or trained with a reputable website, such as the user's business website, to begin the search. A web crawler 120 may be generated by computing device 104. In some embodiments, the web crawler 120 may be trained with information received from a user through a user interface. In some embodiments, the web crawler 120 may be configured to generate a web query. A web query may include search criteria received from a user. For example, a user may submit a plurality of websites for the web crawler 120 to search to extract entity records, inventory records, financial records, human resource records, past entity profiles, past entity data 116, sales records, user notes, and observations, based on criteria such as a time, location, and the like.

With continued reference to FIG. 1, the at least a processor 108 is configured to select at least one probability indicator 124 as a function of entity data 116. "Probability indicator" for the purposes of this disclosure is information within entity data 116 that may affect the resilience of an entity. For example, a particular financial statement within entity data 116 indicating that an entity is losing money may be considered a probability indicator 124. Probability indicators 124 may include any information contained within entity data 116. In some cases, probability indicator 124 may include only information contained within entity data 116. In some cases, the at least a processor 108 is configured to sort the plurality of information within entity data 116 and select only the information that may be indicative of a company's resilience, wherein probability indicator 124 may include at least one selection of the information contained within entity data 116. In some cases, processor 108 may be configured to select more than one probability indicators 124 within entity data 116 in situations in which entity data 116 may contained more than one probability indicators 124. For example, a first probability indicator 124 may include information relating to projected losses of an entity, whereas a second probability indicator 124 may include the retention rate of an entity. In some cases, both the projected losses of an entity and the employee retention rate may be indicative when determining resilience of an entity. In some cases, probability indicator 124 may include a grouping of data relating to a particular topic that may be dispositive of an entity's success. For example, a first probability indicator 124 may include a grouping of any data within entity data 116 related to costs and/or revenue, whereas a second probability indicator 124 may include a grouping of data within entity data 116 related to employee satisfaction and retention. In some cases, probability indicator 124 may include groupings such as diversification of technologies diversification of customer bases, the infrastructure of an entity, information relating to turnover rates, information relating to expected profits, information relating to expected losses, information relating to the growth of an entity, rate of increased profits, information relating to a degree of flexibility during a recession, information relating to debt and the like. In some cases, probability indicator 124 may include a grouping wherein each grouping may be indicative when determining the resilience of an entity. In some cases, computing devices may select at least one probability indicator 124 from a plurality of probability indicators 124.

With continued reference to FIG. 1, processor 108 may select at least one probability indicator 124 as a function of entity data 116 by classifying entity data 116 to an indicator class using a classifier. An "indicator class" for the purposes of this disclosure is a grouping of entity data 116 based on a particular issue that may be indicative when determining the resilience of an entity. As a non-limiting example, indicator classes may include financial groupings, customer groupings, employee groupings, rate of growth groupings and the like. An indicator classifier may be used to label various elements within entity data 116 into a plurality of indicator classes. For example, data within entity data 116 relating to employee retention, employee salaries, employee growth, and the like may be classified to an employee grouping. In some cases, indicator class may include the groupings mentioned above with respect to probability indicator 124, wherein indicator classifier may classify elements within entity data 116 to a particular grouping associated with probability indicator 124. In some cases, probability indicator 124 may include a particular grouping of data, such as for example, a grouping of entity data 116 wherein all the information within the grouping are labeled to a particular class. In some cases, each probability indicator 124 may include information within entity data 116 relating to a particular grouping. In some cases, processor 108 may be configured to classify information within entity data 116 and generate at least one probability indicator 124, wherein the probability indicator 124 contains information within entity data 116 relating to a particular grouping. Data classified in this disclosure may further be classified using fuzzy sets as described below. Fuzzy sets may be useful where data may fit into different categories and/or classes, or where data may be borderline in a category.

With continued reference to FIG. 1, A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, processor 108 may generate and train an indicator classifier configured to receive entity data 116 and output at least an indicator class. Computing device 104 and/or another device may generate a classifier using a classification algorithm, defined as a process whereby a computing device derives a classifier from training data. In some cases indicator classifier may use data to prioritize the order in of labels within entity data 116. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. An indicator classifier may be trained with training data correlating entity data 116 to indicator groupings, such as, financials, employee information, customer information, and the like. Training data may be received from an external computing device 104, user input, and/or previous iterations of processing. An indicator classifier may be configured to input entity data 116 and categorize components of entity data 116 to one or more indicator groupings. Processor 108 and/or computing device 104 may then select any elements within entity data 116 containing a similar label and/or grouping for use as a probability indicator 124. In some cases, probability indicator 124 includes classified data within entity data 116 wherein each probability indicator 124 contains elements within entity data 116 that have been classified to a particular class and/or grouping. For example, a first probability indicator 124 may include elements within entity data 116 classified to an employee grouping, whereas a second probability indicator 124 may include elements within entity data 116 classified to a different grouping. In some cases, processor 108 may only select particular groupings within indicator class to be used as probability indicators 124. For example, processor 108 may select an employee grouping within indicator class to be used with probability indicator 124 whereas another class may not be used. Processor 108 may use a lookup table (described below) to 'lookup' groupings that may be determinative of an entity's resilience. Processor 108 may then select the particular groupings to be used as probability indicators 124. The lookup table may be generated in any way as described in this disclosure, such as by a user, from a database and the like. Data classified in this disclosure may further be classified using fuzzy sets as described below. Fuzzy sets may be useful where data may fit into different categories and/or classes or where data may be borderline in a category. In some cases, probability indicator 124 may be generated and/or selected as a function of the groupings, wherein each probability indicator 124 may include information within entity data 116 relating to a particular grouping. In some cases, entity may be classified using a classifier machine learning model. In some cases classifier machine learning model may be trained using training data correlating a plurality of entity data to a plurality of indicator classes. In an embodiment, a particular element within entity data 116 may be correlated to a particular indicator class. In some cases, classifying entity data may include classifying entity data as a function of the classifier machine learning model. In some cases classifier training data may be generated through user input. In some cases, classifier machine learning model may be trained through user feedback wherein a user may indicate whether a particular element corresponds to a particular class. In some cases, classifier machine learning model may be trained using inputs and outputs based on previous iterations.

With continued reference to FIG. 1, computing device 104 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records.

With continued reference to FIG. 1, selecting at least one probability indicator 124 may include selectin at least one probability indicator 124 using a machine learning model. Processor 108 may use a machine learning module, such as a machine learning module for the purposes of this disclosure, to implement one or more algorithms or generate one or more machine-learning models, such as an assessment machine learning model, to calculate at least one smart assessments. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. A machine learning module, such as indicator module, may be used to generate indicator machine learning model 136 and/or any other machine learning model using training data. indicator machine learning model 136 may be trained by correlated inputs and outputs of training data. Training data may be data sets that have already been converted from raw data whether manually, by machine, or any other method. Indicator training data 128 may be stored in a database. Indicator training data 128 may also be retrieved from database. In some cases, the machine learning model may allow for the ability for computing device to compare two items, the ability to sort efficiently, the ability to improve analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer and the like. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

With continued reference to FIG. 1, selecting at least one probability indicator 124 may include receiving indicator training data 128 including a plurality of entity data 116 correlated to a plurality of probability indicators 124. For example indicator training data 128 may be used to show a particular entity data 116 and/or a particular element within entity data 116 may be correlated to one of a plurality of probability indicators 124. In some cases, indicator training data 128 may be used to show that particular elements within entity data 116 may be correlated to particular probability indicators 124. In some embodiments, indicator training data 128 may be received from a user, third party, database, external computing devices, previous iterations of processing, and/or the like as described in this disclosure. Indicator training data 128 may further be comprised of previous iterations of entity data 116 and/or probability indicators 124. Indicator training data 128 may be stored in a database and/or retrieved from a database. In some cases, indicator training data 128 may include historical indicator data 132. "Historical indicator data" for the purposes of this disclosure is information relating to past actions or events associated with an entity and/or entities. The entities within historical indicator data 132 may be separate and/or distinct from the entity described within entity data 116. In some cases, historical indicator data 132 may include information relating to indicators that were dispositive of an entity's success. This may include information such as lawsuits, bankruptcy proceedings, the death a managerial employee (e.g. the death of a CEO), financial losses, economic downturns, and the like. In some cases, historical indicator data 132 may include data that did not have an effect on an entity's success, this may include information such as employee retention rates, the location of the entity, the cleanliness of the entity, various actions taken by the entity (e.g. an employee birthday party, the death of an employee, a salary increase, and the like). Indicator training data 128 may include historical indicator data 132 wherein historical indicator data 132 may indicate that a particular element within entity data 116 has been shown to be dispositive of a company's resilience. In some cases, historical indicator data 132 may be stored on and retrieved from a database. Historical indicator data 132 may be generated using a web crawler 120 as described above. The web crawler 120 may crawl websites such as news websites, state and/or federal court websites, websites related to a particular entity and the like The WebCrawler may be configured to retrieve data associated with an entity and any corresponding probability indicators 124 that had an effect on the outcome of the entity. For example, a web crawler 120 may be configured to retrieve data within a new article describing a recent filing for bankruptcy of an entity and action or event that caused the filing of the bankruptcy. The action or event associated with the filing of bankruptcy may be labeled as a probability indicator 124 wherein the action or event may be dispositive of a company's success. In some cases, historical indicator data 132 may be retrieved from a database. In some cases, historical indicator data 132 may be generated by a user, wherein the user may input data relating to entities and the corresponding actions and/or events that led to the success or demise or the entity. In some cases, training data may be periodically updated using newly gathered historical indicator data 132 based on current events. For example, a new article describing the success of an entity that the corresponding actions associated with the success may be used to update training data.

With continued reference to FIG. 1, selecting at least one probability indicator 124 may include training an indicator machine learning model 136 as a function of the indicator training data 128 and selecting at least one probability indicator 124 as a function of the indicator machine learning model 136. In some cases, indicator training data 128 may be trained through user input wherein a user input may determine if a particular training data was accurate as a result of a previous iteration.

With continued reference to FIG. 1, processor 104 may 'score' elements and/or groupings of entity wherein the score may be determinative of selecting at least one probability indicator 124. For example, an element and/or grouping of entity data 116 may contain a particular score wherein the score may be determinative of selecting the particular element and/or grouping as a probability indicator 124. In some cases, processor 108 may receive a score associated with each element and/or grouping using a lookup table (described herein) wherein each element may contain a corresponding score on the lookup table. Processor 108 may then select the elements that contain a score high enough to be used as a probability indicator 124. In some cases, processor 108 may compare each score within the lookup table to a score threshold. In some cases, each score within the lookup table may be generated by a user, wherein a user, such as a professional with experience in entity resilience, may input corresponding scores to each grouping and/or element associated with entity data 116. In some cases a user may determine a particular score for each element based on its likelihood to impact an entity. For example, a particular element, such as employee retention may always be determinative when determining the resilience of an entity, whereas an entity name may not always be determinative when determining the resilience of an entity. Additionally or alternatively, in some cases, a particular element may be determinative in one scenario and not determinative of resilience in another scenario. For example, the name or description of an entity may be indicative of the entity's resilience in a scenario where the name of the entity may be offensive or cause unsettling feelings to particular demographics. In some cases, processor 108 may receive training data correlating a plurality of entity data to a plurality of weighted indicators. "Weighted indicators" for the purposes of this disclosure are datum that correspond to a particular weighting for each element. For example, an offensive entity name may contain a high weighted indicator whereas an ordinary entity name may contain a low weighted indicator. In an embodiment training data may indicate that a particular entity within entity data may contain a particular weighting. For example, a particular element within entity data may contain a higher weighting whereas another element may contain a lower weighting. In some cases weighted training data may be inputted by a user, received from a database and the like. In some cases training data may be generated in any way as described in this disclosure. In some cases, weighted training data may include a plurality of words that may seem offensive to one or more demographics. The plurality of words may be rated by a user or received from a database and/or the like. In some cases, weighted training data may include information on an entity that has in the past, based on historical data, been determinative of an entity's resilience. In some cases a weighted machine learning model may be trained as a function of weighted training data and output at least one weighted indicator as a function of the weighted machine learning model. In an embodiment, each element and/or grouping within entity data may contain a corresponding weighted indicator, wherein processor 108 may select elements and/or groupings with a weighted indicator above a particular threshold to be used as one or more probability indicators 124.

With continued reference to FIG. 1, processor 108 is configured to determine a life probability 140 of the entity as a function of the at least one probability indicator 124. "Life probability" for the purpose of this disclosure is data relating to the company's current resilience. Life probability 140 may include information indicating the lifespan of an entity, wherein "lifespan" for the purposes of this disclosure is how long an entity may continue running before having to shut down, be acquired, or declare bankruptcy. For example, life probability 140 may indicate that a particular entity may only survive for another 10 years. In another non-limiting example, life probability 140 may indicate that a particular entity may survive for another 100 years and/or indefinitely.

In some cases, life probability 140 may include information relating to the resilience and/or health of an entity, wherein life probability 140 may be used to indicate how well a company is operating. In some cases, the lifespan of a company may be used to indicate how well an entity is operating. For example, life probability 140 indicating a shorter life span may be used to indicate that a particular entity is not running properly. However, life probability 140 containing information that a particular entity has a long-life span may be used to indicate that an entity may not be functioning properly. In some cases, an entity may contain a lower life probability 140 when the entity is entirely run by a singular person. In such a case, the entity may only contain a lifespan as long as the user who is running the entity. In some cases, life probability 140 may be determined based on the probability indicators 124 wherein each probability indicator 124 may contribute to the overall lifespan and/or resilience of an entity. In some cases, life probability 140 may include data such as a projected lifespan of the entity. In some cases, life probability 140 may include numerical data associated with a numerical scale, wherein the numerical data in reference to the numerical scale may indicate the health and/or resilience of an entity. For example, a life probability 140 of 40 out of a range of 50 on a numerical scale may indicate that a particular entity is healthy. In some cases, life probability 140 may include at least one probability deviation 144. "Probability deviation" for the purposes of this disclosure is data indicating a change in a company's lifespan and/or resilience. Probability deviation 144 may include numerical data wherein a positive number may indicate a positive contribution to life probability 140 and a negative number may indicate a negative contribution to life probability 140. For example, probability deviation 144 may include data such as '+7' wherein said data may indicate that a particular probability deviation 144 positively contributed to the life probability 140 of an entity. In some cases, life probability 140 may include more than one probability deviation 144 wherein each probability deviation 144 may include data indicating a change in a company's life span. In some cases, processor 108 may first generate a plurality of probability deviations 144 and determine a life probability 140 based on the probability deviations 144. In some cases, life probability 140 may include a sum of more than one probability deviations 144. For example, life probability 140 may include a lifespan of three years when a first probability indicator 124 contains data indicating "+7" and a second probability indicator 124 contains data indicating "−4". The two-probability indicators 124 may be added to create a net value of positive three. In some cases, each probability deviation 144 may be associated to each probability indicator 124. For example, computing devices may generate a first probability deviation 144 as a function of a first probability indicator 124 and a second probability deviation 144 as a function of a second probability indicator 124. Processor 108 may then generate life probability 140 as a function of the probability deviations 144. In some cases each probability deviation 144 may be weighted differently wherein a first probability deviation 144 may contain a higher weighting and thereby have a larger effect on life probability 140.

With continued reference to FIG. 1, determining a life probability 140 as a function of the at least one probability indicator 124 may include receiving life training data 148. life training data 148 may include a plurality of at least one probability indicator 124 correlated to a plurality of life probabilities. In an embodiment a particular probability indicator 124 and/or set of probability indicators 124 may be correlated to a particular life probability 140. Additionally or alternatively, life training data 148 may include a plurality of probability indicators 124 correlated to a plurality of probability deviations 144. In an embodiment a particular probability indicator 124 may be correlated to a particular probability deviation 144. For example, a particular probability indicator 124 such as diversification of technologies may be associated with a probability deviation 144 of '+3'. In some cases, life training data 148 may include historical life data 152. "Historical life data" for the purposes of this disclosure is any past information relating to an entity and its corresponding lifespan. For example, historical life data 152 may include information about a particular technology company and its corresponding life span. In some cases, historical life data 152 may include data contained within historical indicator data 132 along with a lifespan and/or life probability 140 associated with each element within historical indicator data 132. In some cases, historical life data 152 may include a plurality of probability deviations 144 each associated with a particular probability indicator 124. For example, historical data may include a probability indicator 124 of a particular entity and effect on the company that resulted in a corresponding probability deviation 144. Continuing the example, a probability indicator 124 containing information such as lawsuit may have had a corresponding probability deviation 144 of '–3' wherein the lifespan of the entity was decreased by 3 years as a result of the deviation. Historical life data 152 may be stored on, and/or retrieved from, a database. Similar to historical indicator data 132, historical life data 152 may be retrieved using a web crawler 120, wherein the web crawler 120 is configured to retrieve the lifespan of an entity and/or probability deviations 144. Web crawler 120 may parse through websites such as social media websites, court records, company websites and the like to determine the life expectancy of the entity. In some embodiments, life training data 148 may be received from a user, third party, database, external computing devices, previous iterations of processing, and/or the like as described in this disclosure. life training data 148 may further be comprised of previous iterations of probability indicators 124 and corresponding life probabilities. Life training data 148 may be stored in database and/or retrieved from a database. Determining life probability 140 may further include training a life machine learning model 156 as a function of life training data 148 and generating life probability 140 as a function of life machine learning model 156. In some cases, life training data 148 may be trained through user input wherein a user input may determine if a particular life probability 140 was accurate based on previous iterations.

With continued reference to FIG. 1, processor 108 is further configured to generate growth approach 160 as a function of life probability 140. "Growth approach" for the purposes of this disclosure is information relating to steps and/or instructions to maintain and/or increase the resilience of an entity. For example, growth approach 160 may include information containing instructions on how a user associated with amenity may be able to increase the life probability 140 or lifespan of an entity. Growth approach 160 may include instructions, such as for example, instructions informing a user to increase the entity's projected growth, instructions informing a user to diversify the entity's technologies, instructions informing a user to decrease debt or refinance debt and the like. In some cases, growth approach 160 may include instructions Guiding a user on how to maintain a particular life probability 140. For example, growth approach 160 may instruct a user to continue to pay off debt or continue to expand client bases in order to maintain a particular life probability 140. In some cases growth approach 160 may include at least one growth deviation 164. "Growth deviation" for the purposes of this disclosure is instructions for user to increase or maintain a particular probability deviation 144. For example, a user may have a plurality of probability deviations 144 wherein some probability deviations 144 positively contribute to the resilience of an entity whereas other probability deviations 144 negatively contribute to the resilience of an entity. Processor 108 may generate at least one growth deviation 164 wherein each growth deviation 164 is associated to a particular probability deviation 144. In some cases, processor 108 may generate growth deviations 164 only for particular probability deviations 144 that are negatively contributing to the resilience and/or life span of an entity. In some cases, growth approach 160 may include a plurality of growth deviations 164 wherein each growth deviation 164 is associated with a particular probability deviation 144. In some cases, a user may wish to follow instructions on one growth deviation 164 and ignore the instructions of another growth deviation 164. In some cases, a user may prioritize a particular growth deviation 164 based on its magnitude of importance. For example, a user may prioritize a growth deviation 164 associated with a probability deviation 144 negatively impacting an entity over a growth deviation 164 associated with a probability deviation 144 that may not be negatively impacting a company. In some cases, growth approach 160 may include information indicating a level of importance with respect to each growth deviation 164. For example, a particular probability indicator 124 negatively impacting the lifespan of a company may contain a corresponding growth deviation 164 that is prioritized over another growth deviation 164. In some cases, the level of importance may be generated based on the probability deviation 144 wherein a growth deviation 164 associated with a positive probability deviation 144 may be given a lower level of importance than a growth deviation 164 associated with a negative probability derivation.

With continued reference to FIG. 1, in some cases, growth approach 160 and/or growth deviation 164 may include more than one growth strategies 168. "Growth strategy" for the purpose of this disclosure is information relating to tactics that may be used to assist a user in completion of growth approach 160. For example, a growth strategy 168 may include information and/or instructions regarding increasing the confidence in an individual in order to motivate the individual to complete a particular growth strategy 168. In some cases, growth strategy 168 may include strategies for employees, or other people associated with the entity, to assist in the completion of the growth approach 160. In some cases, each growth deviation 164 may include a particular growth strategy 168 configured to assist with implementation and completion of the growth deviation 164. In some cases each growth strategy 168 may include a momentum strategy. "Momentum strategy" for the purpose of this disclosure is information and/or instruction guiding a user on how to increase momentum within a particular individual or individuals associated with an entity. Momentum strategy may be used to increase momentum for a particular growth approach 160 and/or growth deviation 164 to ensure completion of the growth approach 160. Momentum strategy may include data such as information describing why a particular growth approach 160 may increase the confidence of the company. Momentum strategy may further include information and/or instructions guiding a user on how to build momentum for a particular growth approach 160 and/or deviation. For example, a particular growth deviation 164 containing instructions for a user to decrease debt may contain a corresponding momentum strategy explaining why a decrease in debt may be beneficial for employees associated with an entity. In some cases, growth strategy 168 may further include morale strategy. "Morale strategy" for the purposes of this disclosure is information describing to a user, or individuals associated with an entity on why the user should be proud about the particular growth approach 160 and/or deviation. For example, growth deviation 164 indicating to decrease debt may include corresponding information describing that a user should be proud about the decrease in debt because it would give the entity an opportunity to invest in other areas that may positively affect the entity and/or the users associated with the entity. In some cases, growth strategy 168 may include motivation strategy. "Motivation strategy" for the purposes of this disclosure is information and/or instruction describing why a user should be excited about a particular growth deviation 164. For example, motivation strategy may include information indicating that a particular growth deviation 164 may lead to increased profits and/or increased salaries. As a result, a user may be motivated and/or excited to implement the growth deviation 164 in order to increase their salary.

With continued reference to FIG. 1, growth approach 160 may be generated using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include previous examples of growth approaches 160 and/or growth deviation 164 compared to life probability 140 and/or probability deviations 144. Data within the lookup table may be received from a database. Lookup tables may also be used to identify growth approach 160 and/or growth deviation 164 by matching an input value to an output value by matching the input against a list of valid (or invalid) items in an array. In a non-limiting example, growth approach 160 may be associated with a particular growth deviation 164 and/or probability indicator 124 wherein the particular growth approach 160 is 'looked-up' using the probability indicator 124 and/or probability deviation 144. Processor 108 may be configured to "lookup" or input one or more probability indicators 124 and/or probability deviations 144 in order to receive a corresponding output or a particular growth approach 160. In some cases, a lookup table may include a plurality of growth deviations 164. Wherein each growth deviation 164 is associated with a particular grouping within probability indicator 124 and a corresponding probability deviation 144. For example, a particular growth approach 160 may be looked up using a particular grouping associated within probability indicator 124 and the corresponding probability deviation 144. In some cases, a particular growth approach 160 may be associated with a range of values. For example, a range of probability deviations 144, such as for example, a range between −5 and 0 may be associated with a particular growth approach 160. In some cases, computing devices may select the particular growth approach 160 and/or growth deviation 164 that falls within a particular range. In some cases, growth approach 160 within the lookup table may be populated using historical data. For example, a particular entity in the past may have had a particular projected lifespan wherein completion of a growth plan assisted in the increase of the lifespan of the entity. Historical data may be received using a web crawler 120 or any other method described in this disclosure. In some cases a plurality of growth approach 160 may be generated based on previous entities who have implemented a particular growth plan. In some cases, historical data may be used to determine that a particular growth plan may positively affect the outcome of an entity, whereas another particular growth plan may have negatively affected an entity. In some cases, the classification label of a particular probability indicator 124 as described above, may be used to find corresponding growth approaches 160 within a lookup table. For example, a particular indicator class label associated with a particular probability indicator 124 may be used to lookup growth data associated with the class. Additionally or alternatively, each class label may contain multiple arrays wherein each array may be associated to a range of probability deviations. For example, lookup table may contain multiple arrays associated with a probability indicator having an 'employee retention' label, wherein each array may contain a range of values such as −5 to 0, 0 to 2, 2 to 4 and the like.

With continued reference to FIG. 1, growth approach 160 may be generated using a growth machine learning model. The growth machine learning model may be trained with training data including a plurality of life probabilities correlated to a plurality of growth approach 160. In some cases, the training data may include a plurality of probability deviations 144 correlated to a plurality of growth deviations 164. Training data may be generated in any way as described in this disclosure. generating growth approach 160 may further include generating growth approach 160 as a function of the growth machine learning model.

With continued reference to FIG. 1, processor 108 may further be configured to create a user interface data structure 172. As used in this disclosure, "user interface data structure" is a data structure representing a specialized formatting of data on a computer configured such that the information can be effectively presented for a user interface. In some cases, user interface data structure 172 includes life probability 140 and growth approach 160. In some cases, user interface data structure 172 may include any data described in this disclosure.

With continued reference to FIG. 1, processor 108 may be configured to transmit the user interface data structure 172. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to a database wherein the data may be accessed from a database, processor 108 may further transmit the data above to a device display or another computing device 104.

With continued reference to FIG. 1, apparatus 100 may further include a graphical user interface 176 (GUI) communicatively connected to processor 108. For the purposes of this disclosure, a "user interface" is a means by which a user and a computer system interact; for example, through the use of input devices and software. A user interface may include graphical user interface, command line interface (CLI), menu-driven user interface, touch user interface, voice user interface (VUI), form-based user interface, any combination thereof and the like. In some embodiments, a user may interact with the user interface using a computing device distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 176 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, apparatus 100 may further include a display 180 communicatively connected to at least a processor 108. "Display" for the purposes of this disclosure is a device configured to show visual information. In some cases, display 180 may include a liquid crystal display (LCD), a cathode ray tube (CRT), a plasma display, a light emitting diode (LED) display, and any combinations thereof. Display 180 may include a display device. Display device may include, but is not limited to, a smartphone, tablet, laptop, monitor, tablet, and the like. Display device may include a separate device that includes a transparent screen configured to display computer generated images and/or information. In some cases, display 180 may be configured to present GUI 176 to a user, wherein a user may interact with GUI 176. In some cases, a user may view GUI 176 through display 180.

With continued reference to FIG. 1, display 180 may be configured to receive the user interface structure and display life probability 140 and growth approach 160 as a function of the user interface data structure 172. GUI 176 may be displayed on a display device such as display 180 wherein data may be viewed through the user interface. In some cases, GUI 176 may contain an interaction component. "Interaction component" for the purposes of this disclosure is a device or a computer program that is capable of allowing a user to interact with GUI 176. Interaction component may include a button or similar clickable elements wherein the clicking of the button may initiate a response or a command. In some cases, interaction component may allow a user to input entity data 116, wherein interaction component may include a text box or clickable buttons that allow a user to input entity data 116. In some cases, interaction component may include multiple check boxes on a display, wherein the clicking of a checkbox may indicate to processor 108 that a specific input was entered. For example, a checking of a checkbox having the number "one" displayed on it, may indicate to processor 108 that user has entered a score of "1". Interaction component may further contain drop down menus where a user may choose from a list of commands wherein the list of commands may perform different functions. For example, a command may include pausing or stopping the data that is being displayed. In some cases, a command may allow a user to process another iteration or go back and input more data. Interaction component may further include dialog or comment boxes wherein users may enter comments about data that is displayed. Comment boxes may be consistent with user input as described. Interaction component may further allow a user to modify or change data within life probability 140 and/or probability deviation 144. In some cases, interaction component may be used to provide feedback to an operator. In some cases, interaction component may allow a user to provide feedback on any data generated by computing such that a machine learning model may be trained to provide better results.

With continued reference to FIG. 1, display 180 may be configured to display life probability 140 and any corresponding probability deviations 144. In some cases, display 180 may further display at least one probability indicator and the corresponding probability deviation 144. For example, display 180 may display a particular probability indicator 124 and a corresponding probability deviation 144 wherein a user may visually see the effect of each probability indicator 124. In some cases, display 180 may be configured to display data as 'clickable elements' through the use of GUI 176 wherein a user may select a particular data and view any data that may be associated. For example, display 180 may display probability indicator 124 as a clickable element wherein selection of probability element may signal to processor 108 to display the corresponding probability deviation 144. In some cases, display 180 may be configured to display at least one probability deviation 144 wherein selection of a particular probability deviation 144 through GUI 176 may display a growth deviation 164 associated with a particular deviation. In some cases, growth deviation 164 may be displayed as a function of user selection wherein selection of a particular probability deviation 144 may signify to processor 108 and/or display 180 to display a particular growth deviation 164.

Figure 2:
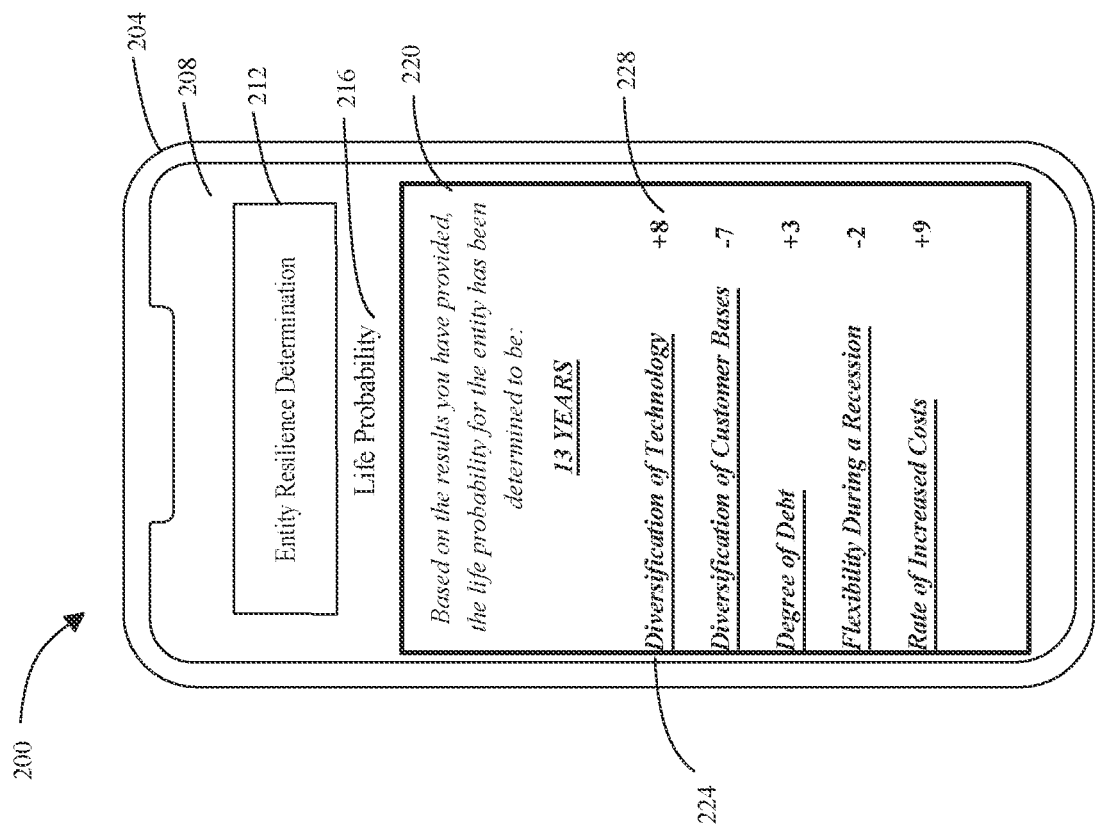
FIG. 2 is an exemplary embodiment of a graphical user interface in accordance with the subject disclosure.

Referring now to FIG. 2, an exemplary embodiment of a GUI 200 on a display device 204 is illustrated. GUI 200 is configured to receive the user interface structure as discussed above and display any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purpose of this disclosure is the information that is capable of being displayed within a border of device display. A user may navigate through different windows 208 wherein each window 208 may contain new or differing information or data. For example, a first window 208 may display the probability indicators 224 as described in this disclosure, whereas a second window may display the growth approaches as described in this disclosure. A user may navigate through a first second, third and fourth window (and so on) by interacting with GUI 200. For example, a user may select a button or a box signifying a next window on GUI, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows wherein each window may request or display information to or form a user. In this instance, window 208 displays an identification field 212 wherein the identification field signifies to a user, the particular action/computing that will be performed by a computing device. In this instance identification field 212 contains information stating "entity resilience determination" wherein a user may be put on notice that any information being received or displayed will be used to determine the resilience of an entity. Identification field 212 may be consistent throughout multiple windows 212. Additionally, in this instance window 108 may display a sub identification field 216 wherein the sub identification field may indicate to a user the type of data that is being displayed or the type of data that is being received. In this instance, sub identification field 216 contains "life probability". This may indicate to a user that computing device is displaying the life probability of an entity to a user and any other relevant information associated to the life probability. Additionally, window 208 may contain a prompt 220 indicating the data that is being described in sub identification field 1216 wherein prompt 220 is configured to display to a user the data that has been generated. In this instance, prompt 220 notifies a user that the life probability of an entity was determined to be 13 years. Further GUI may contain data relating to determination of the life probability. In this instance, GUI displays probability indicators 224 wherein each probability indicator 224 contains a corresponding probability deviation 228. GUI 200 may display the probability indicators 224 and the corresponding probability deviations 228 such that a user may visually see how each particular indicator contributed to the overall life probability displayed within prompt 220. In some cases, a user may select a particular probability indicator 224 to be navigated to another window 208 wherein a user may view the growth approach and/or growth deviations as described in this disclosure.

Figure 3:
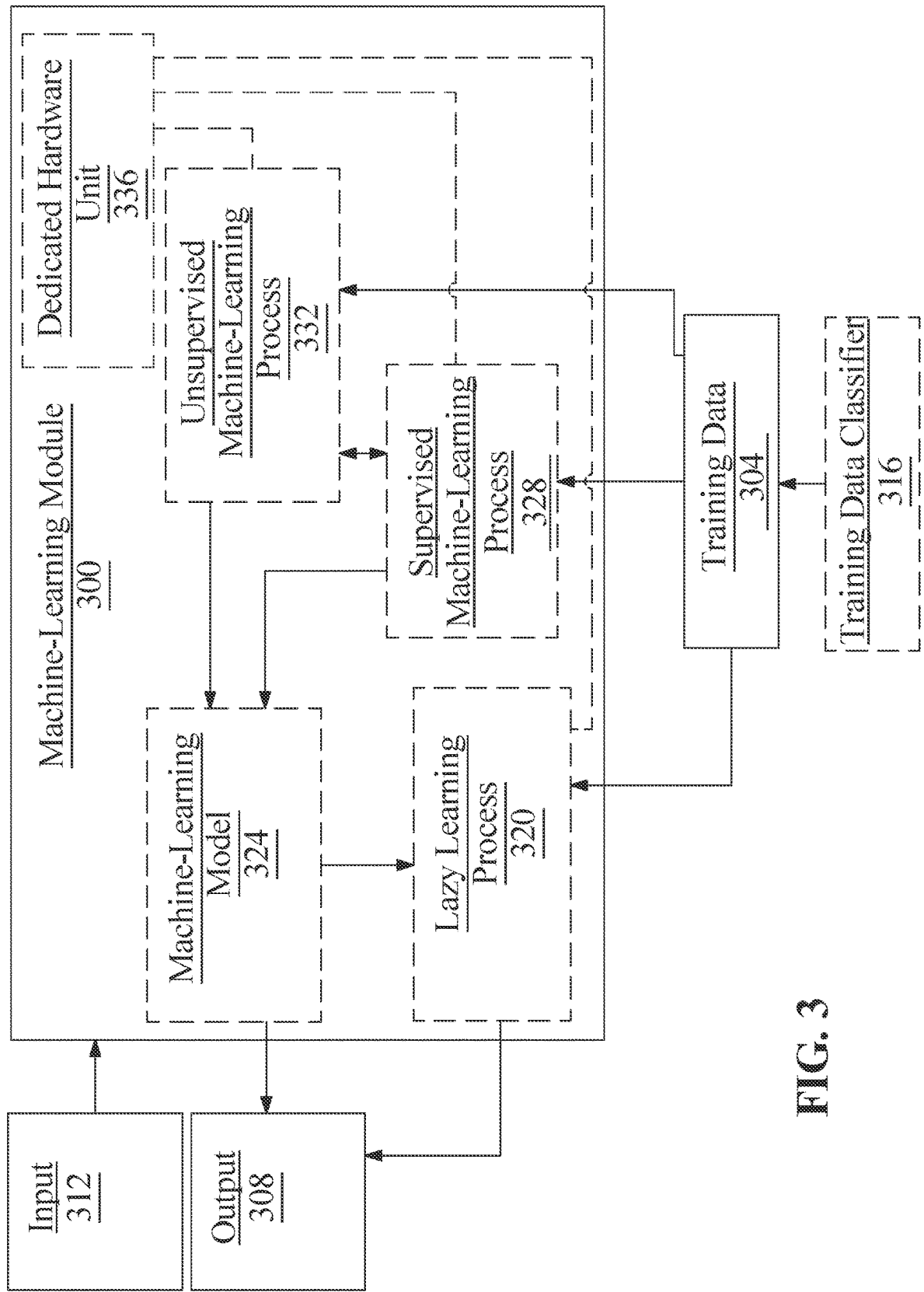
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include entity data and/or probability indicator as described above as inputs and outputs may include life probabilities and/or probability indicators as described above as outputs.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to one or more classes such as an indicator classes as described above. In one or more embodiments, a particular element of training data may be classified to an indicator classes wherein correlated elements may be classified to the same class. In some cases, an input such as an element of entity data may be classified to an indicator class wherein an output classified to the same indicator class may be selected.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include probability indicators as described above as inputs, life probabilities as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
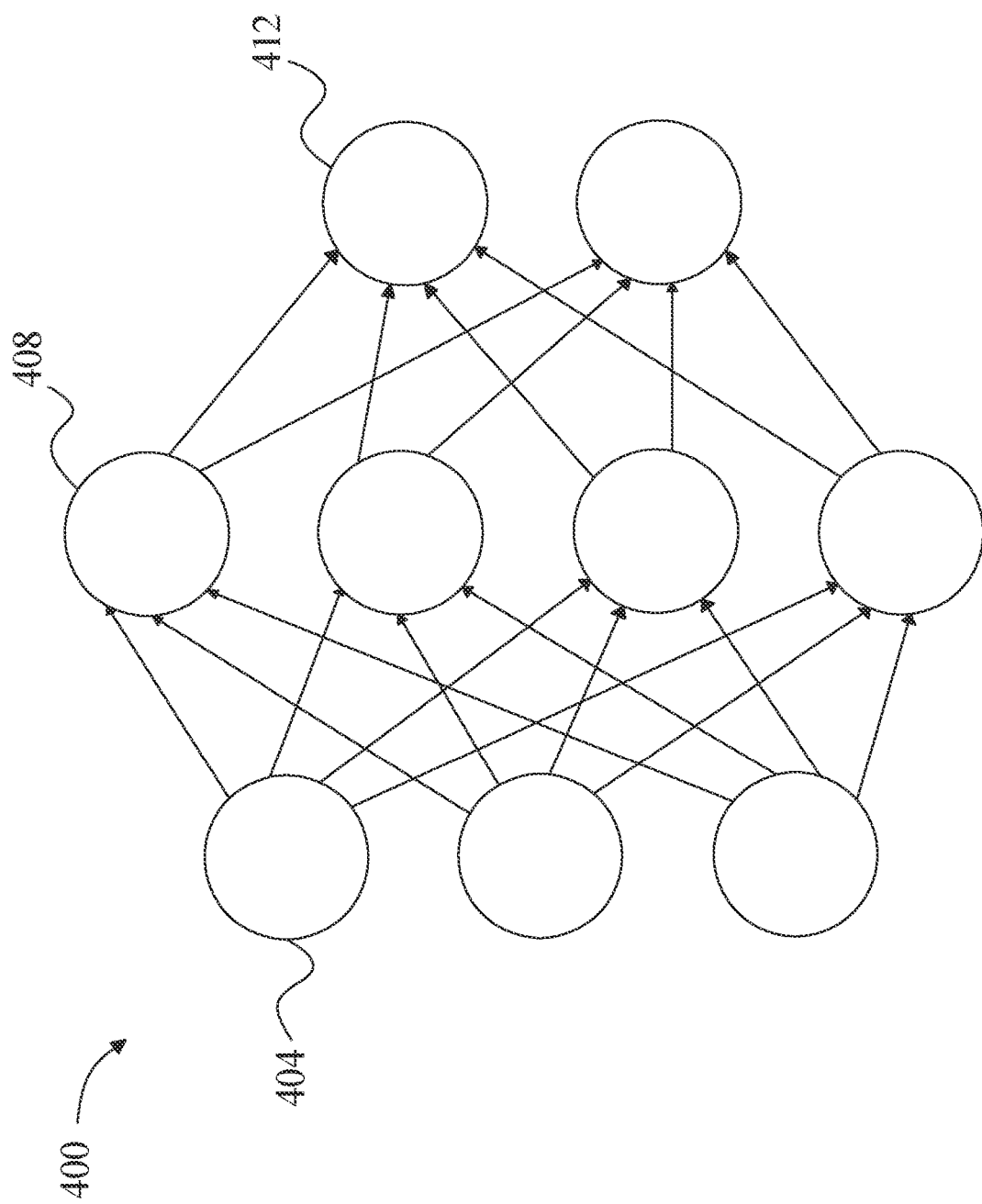
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
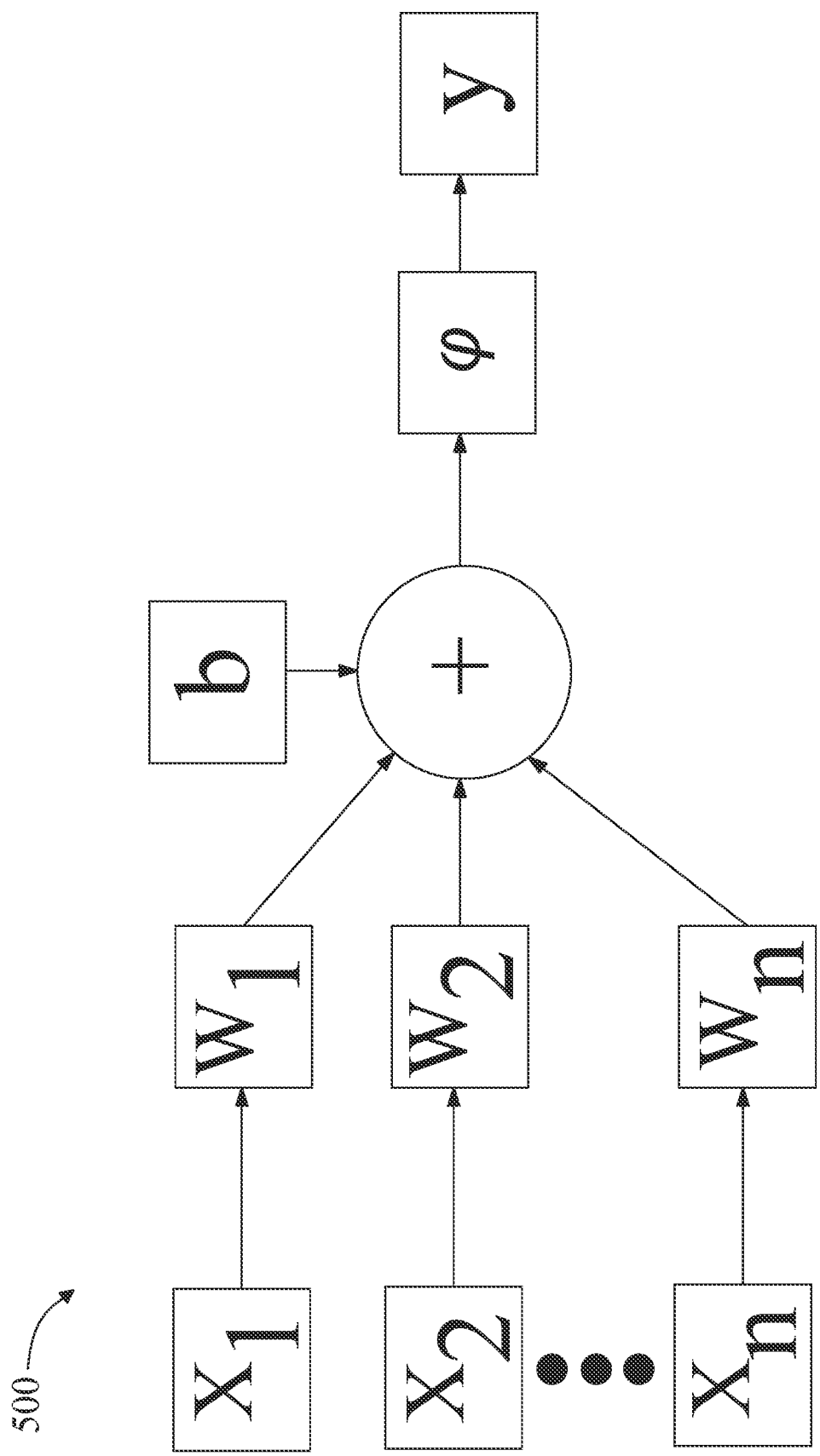
FIG. 5 is a block diagram of an exemplary embodiment of a node.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
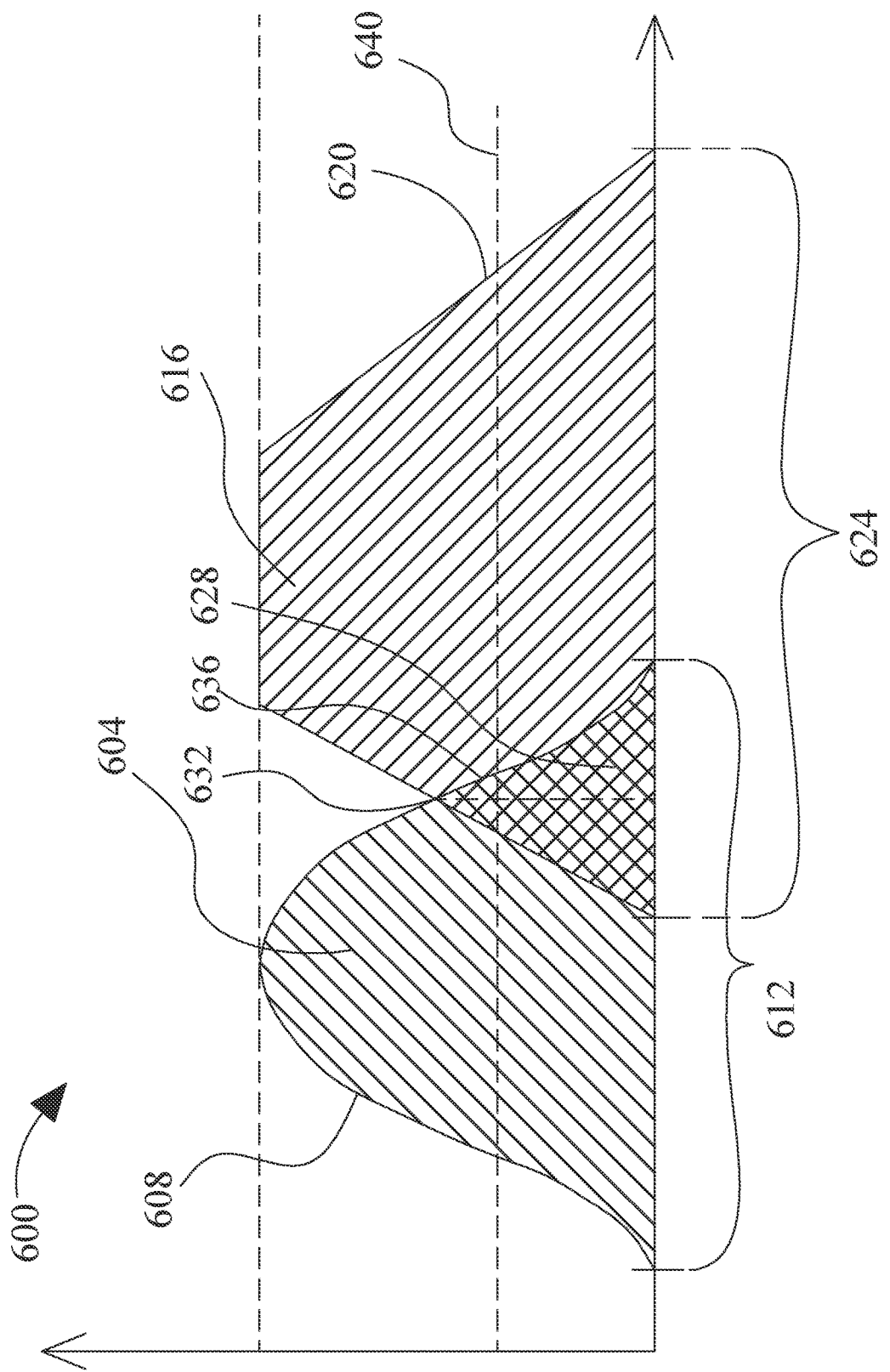
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, entity data, and a predetermined class, such as without limitation of indicator class. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or entity data and a predetermined class, such as without limitation indicator class categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify an entity data with indicator class. For instance, if an indicator class has a fuzzy set matching entity data fuzzy set by having a degree of overlap exceeding a threshold, computing device may classify the entity data as belonging to the indicator class categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an entity data may be compared to multiple indicator class categorization fuzzy sets. For instance, entity data may be represented by a fuzzy set that is compared to each of the multiple indicator class categorization fuzzy sets; and a degree of overlap exceeding a threshold between the entity data fuzzy set and any of the multiple indicator class categorization fuzzy sets may cause computing device to classify the entity data as belonging to indicator class categorization. For instance, in one embodiment there may be two indicator class categorization fuzzy sets, representing respectively indicator class categorization and an indicator class categorization such as any categorization described above. First indicator class categorization may have a first fuzzy set; Second indicator class categorization may have a second fuzzy set; and entity data may have an entity data fuzzy set. computing device, for example, may compare an entity data fuzzy set with each of indicator class categorization fuzzy set and in indicator class categorization fuzzy set, as described above, and classify an entity data to either, both, or neither of indicator class categorization nor in indicator class categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, entity data may be used indirectly to determine a fuzzy set, as entity data fuzzy set may be derived from outputs of one or more machine-learning models that take the entity data directly or indirectly as inputs.

Still referring to FIG. 6, a computing device may use a logic comparison program, such as, but not limited to, a fuzzy logic model to determine an indicator class response. An indicator class response may include, but is not limited to, similar, not similar and the like; each such indicator class response may be represented as a value for a linguistic variable representing indicator class response or in other words a fuzzy set as described above that corresponds to a degree of similarity as calculated using any statistical, machine-learning, or other method that may occur to a person skilled in the art upon reviewing the entirety of this disclosure. In other words, a given element of entity data may have a first non-zero value for membership in a first linguistic variable value such as "a first score label" and a second non-zero value for membership in a second linguistic variable value such as "second score label" In some embodiments, determining an indicator class categorization may include using a linear regression model. A linear regression model may include a machine learning model. A linear regression model may be configured to map data of entity data, such as degree of linguistic score to one or more indicator class parameters. A linear regression model may be trained using a machine learning process. A linear regression model may map statistics such as, but not limited to, quality of entity data linguistic score. In some embodiments, determining an indicator class of entity data may include using an indicator class classification model. An indicator class classification model may be configured to input collected data and cluster data to a centroid based on, but not limited to, frequency of appearance, linguistic indicators of quality, and the like. Centroids may include scores assigned to them such that quality of linguistic score of entity data may each be assigned a score. In some embodiments indicator class classification model may include a K-means clustering model. In some embodiments, indicator class classification model may include a particle swarm optimization model. In some embodiments, determining the indicator class of an entity data may include using a fuzzy inference engine. A fuzzy inference engine may be configured to map one or more entity data elements using fuzzy logic. In some embodiments, entity data may be arranged by a logic comparison program into indicator class arrangement. An "indicator class arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given linguistic score level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to entity data, such as a degree of linguistic score of an element, while a second membership function may indicate a degree of in indicator class of a subject thereof, or another measurable value pertaining to entity data. Continuing the example, an output linguistic variable may represent, without limitation, a score value. An inference engine may combine rules, such as: "if the difficulty level is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity ($T(a, b)=T(b, a)$), monotonicity: ($T(a, b) \leq T(c, d)$ if $a \leq c$ and $b \leq d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "$\bot$," such as max (a, b), probabilistic sum of a and b (a+b−a*b), bounded sum, and/or drastic T-conorm; any T-conorm may be used that satisfies the properties of commutativity: $\bot(a, b)=\bot(b, a)$, monotonicity: $\bot(a, b) \leq \bot(c, d)$ if $a \leq c$ and $b \leq d$, associativity: $\bot(a, \bot(b, c))=\bot(\bot(a, b), c)$, and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, entity data to be used may be selected by user selection, and/or by selection of a distribution of output scores, such as 60% similar, 40% non-similar and or the like. Each indicator class categorization may be selected using an additional function such as indicator class as described above.

Figure 7:
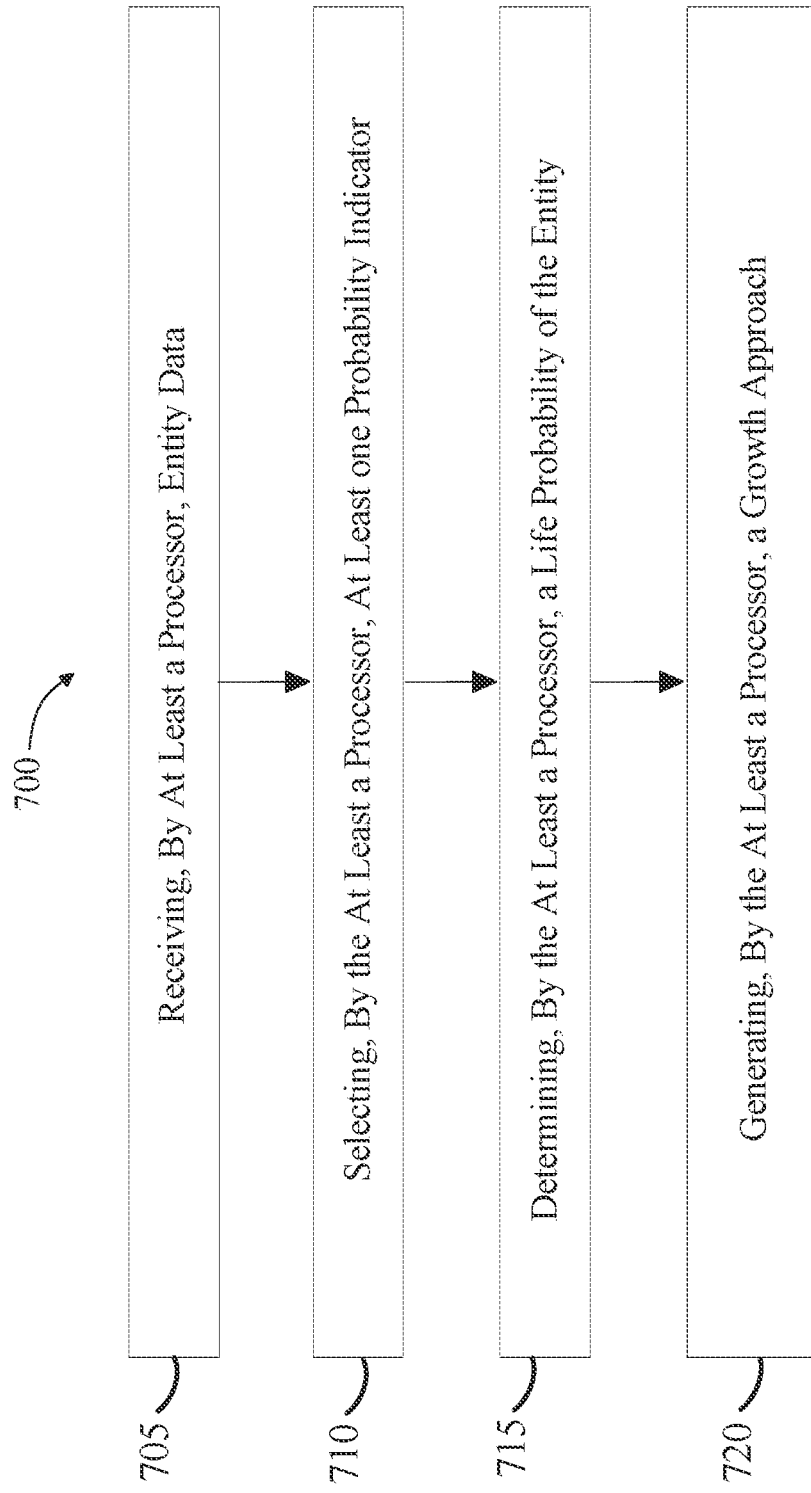
FIG. 7 is a flow diagram illustrating an exemplary embodiment of a method for determining the resilience of an entity.

Referring now to FIG. 7, a method 700 for determining the resilience of an entity is described. At step 705, method 700 includes receiving, by at least a processor, entity data from a user. This step may be implemented as described above with reference to FIGS. 1-7, without limitation.

With continued reference to FIG. 7, at step 710 method 700 includes selecting, by the at least a processor, at least one probability indicator as a function of the entity data. In some cases selecting at least one probability indicator includes, receiving indicator training data having a plurality of entity data correlated to a plurality of probability indicators, training an indicator machine learning model as a function of the indicator training data, and selecting at least one probability indicator as a function of the indicator machine learning model. In some cases, indicator training data includes historical indicator data. This step may be implemented as described above with reference to FIGS. 1-7, without limitation.

With continued reference to FIG. 7, at step 715, method 700 includes determining, by the at least a processor, a life probability of the entity as a function of the at least one probability indicator. Determining a life probability includes receiving life training data a plurality of the least one probability indicators correlated to a plurality of life probabilities, training a life machine learning model as a function of the life training data, and determining the life probability as a function of the life machine learning model. In some cases, life training data includes historical life data. In some cases, life probability includes at least one probability deviation. In some cases, at least one probability deviation is associated with at least one probability indicator. This step may be implemented as described above with reference to FIGS. 1-7, without limitation.

With continued reference to FIG. 7, at step 720 method 700 includes, generating, by the at least a processor, a growth approach as a function of the life probability. In some cases, the growth approach includes at least one growth deviation, the at least one growth deviation associated the at least one probability deviation. In some cases, growth approach includes more than one growth strategy, wherein the more than one growth strategy is configured to assist a user in completion of the growth approach. This step may be implemented as described above with reference to FIGS. 1-7, without limitation.

With continued reference to FIG. 7, method 700 may further include creating, by the at least a processor, a user interface data structure, wherein the user interface data structure includes the life probability and the growth approach. In some cases, method 700 may further include transmitting, by the at least a processor, the user interface data structure to a display. In some cases, method 700 may further include displaying, using the display, the life probability, and the growth approach as a function of the user interface data structure. In some cases, method 700 further includes displaying, using the display, at least one growth deviation of the growth approach as a function of a selection of the at least one probability deviation. This step may be implemented as described above with reference to FIGS. 1-7, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
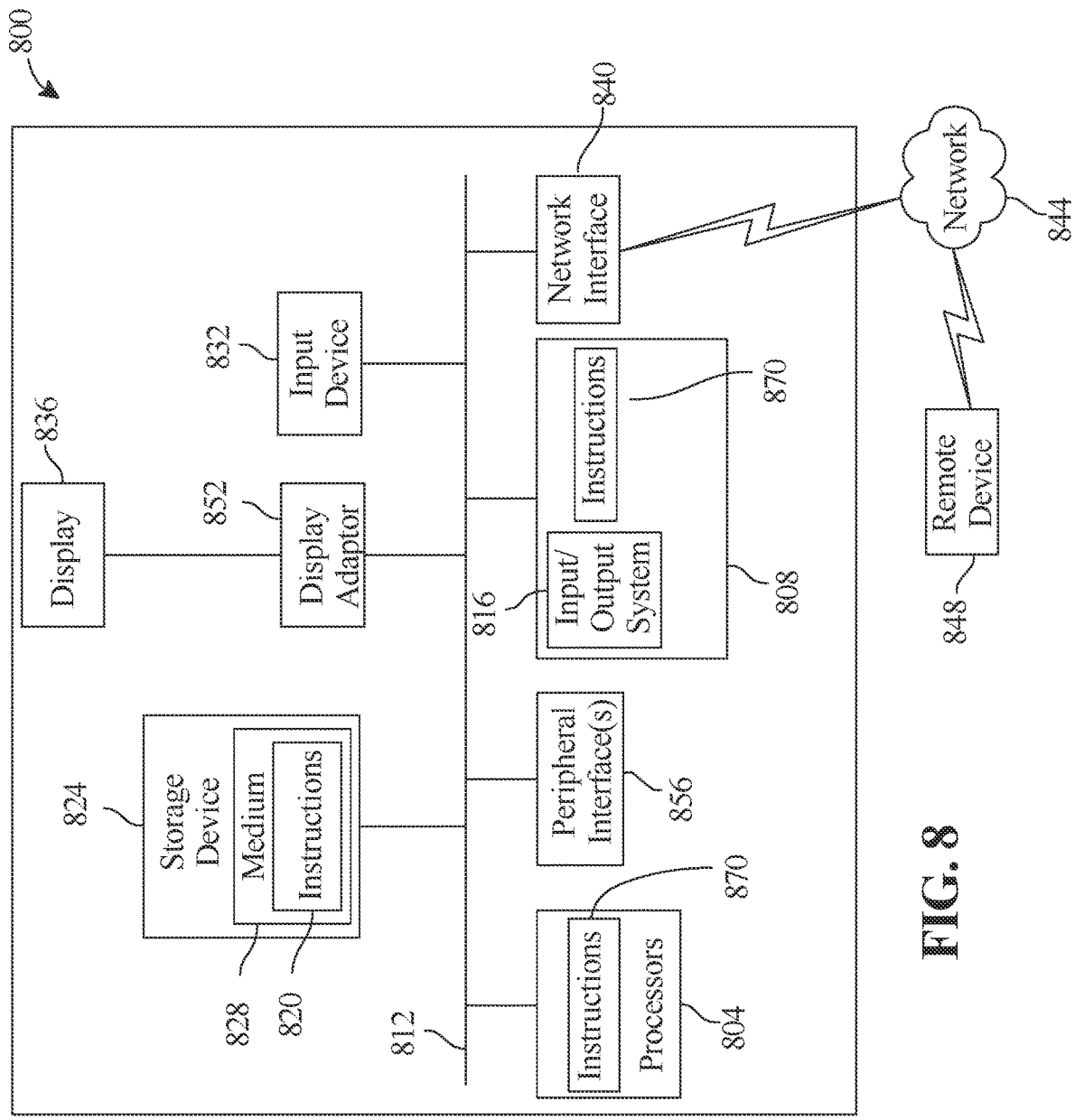
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining the resilience of an entity, the apparatus comprising:
   at least a processor; and
   a memory communicatively connected to the at least a processor, the memory containing instructions configuring the at least a processor to:
   receive entity data from a user wherein the entity data comprises image data pre-processed using an optical character reader to convert the image data into machine-encoded text;
   select at least one probability indicator as a function of the entity data, wherein the at least one probability indicator receives indicator training data having a plurality of entity data correlated to a plurality of the probability indicators;
   determine a life probability of the entity as a function of the at least one probability indicator comprising;
   iteratively training a life machine learning model, as a function of the life training data, wherein iteratively training the life machine learning model further comprises:

using life training data applied to an input layer of nodes comprising at least one probability indicator input, one or more intermediate layers of nodes, and an output layer of nodes comprising a plurality of life probability outputs;

adjusting one or more connections and one or more weights between nodes in adjacent layers of the recommendation machine learning model;

comparing the output layer of nodes and the input layer of nodes to generate an error function;

updating the one or more weights iteratively based on the error function to enhance a degree of accuracy of the one or more weights; and retraining the recommendation machine learning model as a function of the updated one or more weights; and determining the life probability as a function of the life machine learning model; and generate a growth approach as a function of the life probability.

2. The apparatus of claim 1, wherein selecting at least one probability indicator as a function of entity data comprises:

receiving indicator training data comprising a plurality of entity data correlated to a plurality of probability indicators;

training an indicator machine learning model as a function of the indicator training data; and selecting at least one probability indicator as a function of the indicator machine learning model.

3. The apparatus of claim 2, wherein the indicator training data comprises historical indicator data.

4. The apparatus of claim 1, wherein the life training data comprises historical life data.

5. The apparatus of claim 1, wherein the life probability comprises at least one probability deviation.

6. The apparatus of claim 5, wherein the at least one probability deviation is associated with the at least one probability indicator.

7. The apparatus of claim 5, wherein the growth approach comprises at least one growth deviation associated with the at least one probability deviation.

8. The apparatus of claim 1, wherein the growth approach comprises more than one growth strategy, wherein the more than one growth strategy are configured to assist a user in completion of the growth approach.

9. The apparatus of claim 1, wherein:

the memory further containing instructions configuring the at least a processor to:

create a user interface data structure, wherein the user interface data structure comprises the life probability and the growth approach; and transmit the user interface data structure; and the apparatus further comprises a display communicatively connected to the at least a processor, the display configured to:

receive the user interface data structure; and display the life probability and the growth approach as a function of the user interface data structure.

10. The apparatus of claim 9, wherein the life probability further comprises at least one probability deviation, wherein the display is configured to display at least one growth deviation of the growth approach as a function of a selection of the at least one probability deviation.

11. A method for determining the resilience of an entity, the method comprising:

receiving, by at least a processor, entity data from a user wherein the entity data comprises image data preprocessed using an optical character reader to convert the image data into machine-encoded text;

selecting, by the at least a processor, at least one probability indicator as a function of the entity data, wherein the at least one probability indicator receives indicator training data having a plurality of entity data correlated to a plurality of the probability indicators;

determining, by the at least a processor, a life probability of the entity as a function of the at least one probability indicator comprising;

iteratively training a life machine learning model as a function of the life training data wherein iteratively training the life machine learning model further comprises:

using life training data applied to an input layer of nodes comprising at least one probability indicator input, one or more intermediate layers of nodes, and an output layer of nodes comprising a plurality of life probability outputs;

adjusting one or more connections and one or more weights between nodes in adjacent layers of the recommendation machine learning model;

comparing the output layer of nodes and the input layer of nodes to generate an error function;

updating the one or more weights iteratively based on the error function to enhance a degree of accuracy of the one or more weights; and retraining the recommendation machine learning model as a function of the updated one more weights; and determining the life probability as a function of the life machine learning model; and generating, by the at least a processor, a growth approach as a function of the life probability.

12. The method of claim 11, wherein selecting, by the at least a processor, at least one probability indicator as a function of entity data comprises:

receiving indicator training data comprising a plurality of entity data correlated to a plurality of probability indicators;

training an indicator machine learning model as a function of the indicator training data; and selecting at least one probability indicator as a function of the indicator machine learning model.

13. The method of claim 12, wherein the indicator training data comprises historical indicator data.

14. The method of claim 11, wherein the life training data comprises historical life data.

15. The method of claim 11, wherein the life probability comprises at least one probability deviation.

16. The method of claim 15, wherein the at least one probability deviation is associated with the at least one probability indicator.

17. The method of claim 15, wherein the growth approach comprises at least one growth deviation associated with the at least one probability deviation.

18. The method of claim 11, wherein the growth approach comprises more than one growth strategy, wherein the more than one growth strategy is configured to assist a user in completion of the growth approach.

19. The method of claim 11, the method further comprising:

creating, by the at least a processor, a user interface data structure, wherein the user interface data structure comprises the life probability and the growth approach; and transmitting, by the at least a processor, the user interface data structure to a display;

displaying, using the display, the life probability, and the growth approach as a function of the user interface data structure.

20. The method of claim 19, the method further comprising:

displaying, using the display device, at least one growth deviation of the growth approach as a function of a selection of the at least one probability deviation.

* * * * *